United States Patent
Thoreau et al.

(10) Patent No.: US 7,899,119 B2
(45) Date of Patent: Mar. 1, 2011

(54) METHOD AND DEVICE FOR CODING A SEQUENCE OF SOURCE IMAGES

(75) Inventors: Dominique Thoreau, Cesson Sevigne (FR); Edouard Francois, Bourg des Comptes (FR); Anne Lorette, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 1533 days.

(21) Appl. No.: 11/237,421

(22) Filed: Sep. 28, 2005

(65) Prior Publication Data

US 2006/0114996 A1 Jun. 1, 2006

(30) Foreign Application Priority Data

Sep. 28, 2004 (FR) .................................... 04 52179

(51) Int. Cl.
*H04N 7/12* (2006.01)
(52) U.S. Cl. .......... 375/240.16; 375/240.12; 375/240.24; 375/240.27
(58) Field of Classification Search ............. 375/240.16, 375/240.12
See application file for complete search history.

(56) References Cited

U.S. PATENT DOCUMENTS

2003/0206590 A1 11/2003 Krishnamachari

FOREIGN PATENT DOCUMENTS

| WO | WO 02/102083 A1 | 12/2002 |
|---|---|---|
| WO | WO 02/102084 A1 | 12/2002 |

OTHER PUBLICATIONS

"FMO: Flexible Macroblock Ordering", Stephan Wenger and Michael Horowitz; Apr. 30, 2002, pp. 1-10; Source: Teles AG and Polycom Inc., ITU-T Sector Members.
Search Report dated May 17, 2005.

*Primary Examiner* — Samir A Ahmed
*Assistant Examiner* — Ruiping Li
(74) *Attorney, Agent, or Firm* — Robert D. Shedd; Paul P. Kiel; Guy H. Eriksen

(57) ABSTRACT

A method and device for coding an image of a video sequence by image block using the time correlation between images based on movement field calculation. The method includes subdividing the images into blocks of images and a step for configuring the blocks into regions. A region corresponds to a succession of consecutive or non-consecutive blocks, according to the television scanning order of the image. In the inter- or intra-block coding step, the blocks are coded by region according to an ordering of the regions and a region according to the order of succession of the blocks that make up the region. The coded block error correction step includes analyzing the field of movement, a configuring step, and an error correction step. The step for analyzing the field of movement is carried out to calculate a "lifespan" parameter assigned to a block and corresponding to its probability of existence in subsequent images, according to the movement vector associated with this block. The configuring step is performed taking into account the value of this parameter to define and order the regions of the image from most important to least important. The error correction step uses a more effective error correction algorithm for the coded data corresponding to the most important regions than for the data corresponding to the least important regions.

6 Claims, 2 Drawing Sheets

METHOD AND DEVICE FOR CODING A SEQUENCE OF SOURCE IMAGES

FIELD OF THE INVENTION

The invention relates to a method and device for coding an image of a video sequence. It more particularly relates to coding by image block using the time correlation between images based on movement field calculation.

The field is, for example, that of H.264/AVC type video coding.

BACKGROUND OF THE INVENTION

Unlike previous video coding standards, H.261, H.263, MPEG2 or MPEG4, a succession of macroblocks or slice of macroblocks, can be made up of non-consecutive macroblocks in the image, depending on the television type image scanning direction. This possibility is called flexible macroblock ordering (FMO). This tool is described, for example, in the contribution by S Wenger and M Horowitz, JVT-C089 ISO/MPEG & ITU, May 2002.

In the context of video image transmission over multi-vendor networks, in which normally the high transmission error rate is characterized by the loss of packets, there is a need to protect the packets of compressed data using, among other things, error correcting codes such as the Reed-Solomon codes or the forward error correction (FEC) continuous checking codes. These error correction algorithms, based on redundancy, and therefore expensive in terms of coding cost, do not, however, prioritize areas of images deemed important for coding.

SUMMARY OF THE INVENTION

The object of the invention is to overcome the abovementioned drawbacks.

To this end, one subject of the invention is a method of coding a sequence of images including a step for subdividing the images into blocks of images, a step for partitioning the image into regions, a region comprising a succession of consecutive or non-consecutive blocks, according to the television scanning order of the image,
- a step for estimating movement between a current image and a preceding image of the sequence to provide a field of movement associating movement vectors with the image blocks,
- an inter- or intra-block coding step, the blocks being coded by region according to an ordering of the regions, and, for a region, according to the order of succession of the blocks that make up the region,
- a coded block error correction step, characterized in that,
- a step for analysing the field of movement is carried out to calculate a "lifespan" parameter assigned to a block and corresponding to its probability of existence in subsequent images, according to the movement vector associated with this block,
- the partitioning step is performed taking into account the value of this parameter to define and order the regions in the image from most important to least important,
- the error correction step uses a more effective error correction algorithm for the coded data corresponding to the first regions than for the data corresponding to the latter regions.

According to a particular embodiment, the "lifespan" parameter of the block is calculated by extrapolating the movement vector of the field of movement assigned to the block.

According to a particular embodiment, the images taken into account in the image reference base to determine the probability of existence are the images other than those of conventional predictive bidirectional B type, or even images other than those of conventional predictive bidirectional B and B-stored type.

According to a particular embodiment, the movement vectors calculated for the image numbered M of the sequence of images are extrapolated towards the images numbered M+m, M+2m, M+3m . . . , m being a positive integer, and the value of the parameter of a block depends on the number of times the end of the vector assigned to this block belongs to these images.

According to a particular embodiment, a region is defined by an upper limit and a lower limit of the parameter, a region being made up of the set of blocks for which this parameter is included in the range defining this region.

According to a particular embodiment, the data relating to the coding of the blocks is structured in data packets ordered according to the importance assigned to the regions corresponding to the packets.

According to a particular embodiment, a region is made up of a slice group as defined in the H.264/AVC standard.

The invention also relates to a device for coding a sequence of images to implement the method, comprising a circuit for subdividing images and configuring regions to configure the image into regions made up of blocks of images and supply these blocks of images according to an order of sequencing of the regions, to a movement estimation circuit and to an inter and intra coding circuit, the coded blocks being transmitted to an error correction circuit, a movement field analysis circuit for calculating a "lifespan" parameter of the blocks according to the movement vectors of the movement field, the circuit for subdividing images and configuring slices receiving the lifespan parameter to configure and order the regions from most important to least important according to this parameter, and the error correction circuit implementing more effective algorithms for the data corresponding to the first regions than for those corresponding to the latter.

The regions are thus made up and ordered according to the content of the scene and in particular the nature of the movement field. An order of importance of the regions is established according to the lifespan of the blocks or macroblocks of the region, that is, the use of the macroblocks or blocks of the image for the predictive coding of the subsequent images.

With the invention, the quality of the restored image is enhanced, the regions deemed the most essential being able to use the most powerful correcting codes. Furthermore, the error processes in the decoder based on analysis of the movement field are more effective.

BRIEF DESCRIPTION OF THE DRAWINGS

Other features and advantages of the invention will become clearly apparent from the description, given by way of non-limiting example, and based on the appended figures representing:

FIG. 2, a distribution of the regions of the context of a zoom,

FIG. 3, a distribution of the regions in the context of a pan to the left.

DETAILED DESCRIPTION OF PREFERRED EMBODIMENTS

Figure 1:
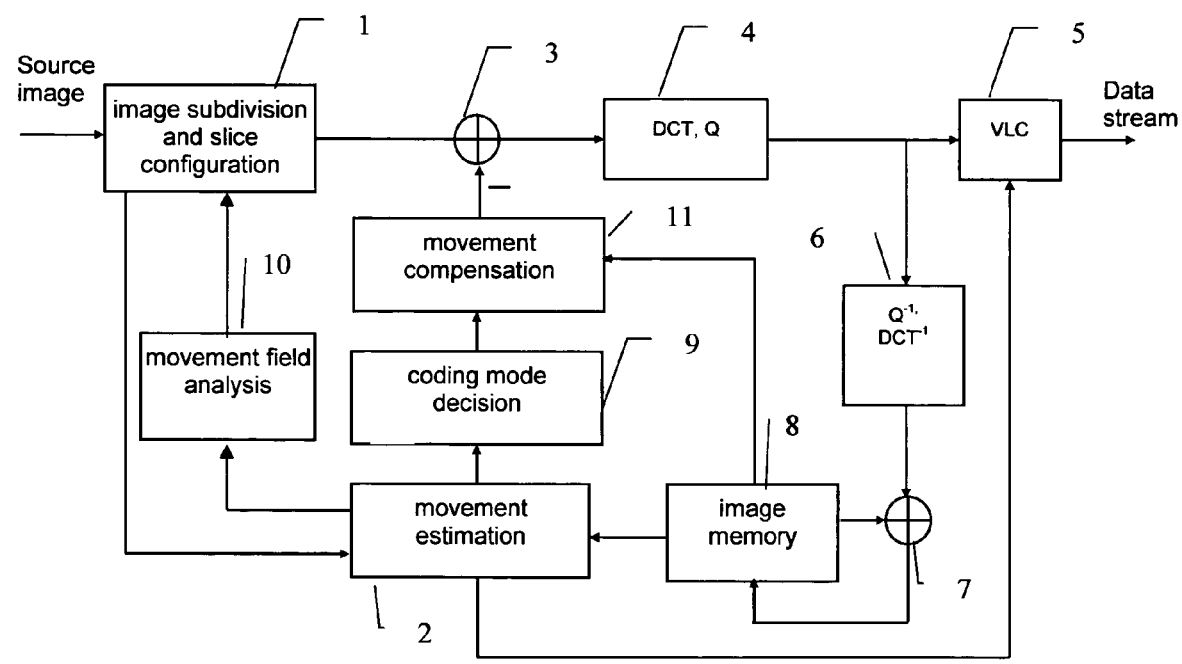
FIG. 1, a block diagram of a coder according to the invention.

FIG. 1 describes a coder for implementing the method according to the invention.

The digital video data of a source image of the video sequence is received as coder input to be transmitted to a circuit for subdividing the image and configuring the regions 1 which subdivides the image into macroblocks and configures the macroblocks into regions. The blocks of images forming the macroblocks are transmitted, on a first output, to a movement estimation circuit 2 and, on a second output, to a first input of a subtractor 3. According to the coding mode, intra or inter, the subtractor 3 transmits the information concerning the current block received on its first input or indeed subtracts from the latter the information corresponding to a predicted block available on its second input. The data at the output of the subtractor is transmitted to a discrete cosine transformation and quantization circuit 4. The quantized coefficients at the output of this circuit are subjected to entropic coding via the variable length coder 5 (VLC).

The current image is reconstructed to supply predicted blocks. Thus, the quantized coefficients are subjected to inverse quantization and an inverse discrete cosine transformation via the reference circuit 6 to give decoded luminance values.

The adder 7 is used to add the predicted block to the decoded coefficients block, if it is coded in intermode. The reconstructed block is stored in an image memory 8 which stores the reconstructed current image.

The movement estimation circuit 2 receives the information concerning a previous decoded or reconstructed image stored by the image memory 8 and the information concerning the current macroblock of the source image originating from the image subdivision and region configuration circuit 1. It performs a correlation calculation between this current macroblock and the reconstructed image according to a known principle, to provide the movement vectors. These vectors are transmitted to a coding mode decision circuit 9 which performs coding cost calculations to determine the most appropriate coding mode and to a movement field analysis circuit 10. The coding mode and, where appropriate, the corresponding movement vectors are transmitted to a movement compensation circuit 11 which provides movement compensation for the reconstructed image to supply, to the second input of the subtractor 3, a predicted image block originating from this reconstructed image. The movement vectors are also transmitted to the entropic coding circuit 5 for their coding and transmission to the decoder. The information calculated by the movement field analysis circuit is transmitted to the region configuration circuit which configures the image into regions comprising a slice or a group of slices, orders the regions to define the order of coding of the image blocks. For example, after having configured the image into regions by assigning all the macroblocks of the image to the different regions, the macroblocks of a region are formed into a slice or slice group as defined in the H.264/AVC standard.

The data stream at the output of the coder proper is transmitted to a circuit applying error correcting codes, not shown in the figure, before being sent over the distribution network, for example the Internet, to the decoder. This circuit adds redundancy via error correcting codes for each region or for each slice. The error correcting algorithm is chosen to be particularly effective for the first coded regions or slices of the image which are therefore more costly, in terms of coding cost, because of the redundancy level, and less and less effective for the subsequent regions or slices which are therefore less costly to code.

The regions are formed according to the nature of the movement field relative to the macroblocks and the importance, from the content point of view, of the area or areas of the image. Depending on the nature of the movement field, it may be advisable to give priority to protecting certain parts of the image. The regions can be configured on the basis of the concept of lifespan of the macroblock in the image reference base.

Thus, the movement field analysis circuit calculates, according to the movement fields supplied by the movement estimation circuit, a "lifespan" parameter which it assigns to each block or macroblock of the image and dependent on its movement vector. This parameter corresponds to the probability of existence of the image block in the next images to be coded. It becomes all the greater when the number of images in which the block being processed should be located becomes greater. Its value depends on the movement calculated for the image block, its amplitude and its direction.

Assuming that the movement is constant, a calculation can consist in extrapolating the movement vectors assigned to the macroblocks of the image M towards the images M+m, M+2m, M+3m . . . , m being, in number of images, the analysis period chosen for the images. The value of the parameter is that much greater when the number of images in which the macroblock should appear is high.

The images to be coded are intra-images and inter-images of predictive type P, B-stored type (according to the term used in the H.264/AVC standard) or even of conventional B bidirectional predictive type. The reference images of I, P, even B-stored type, are more important than the conventional B type images because they are used for the predictive coding. Thus, it is possible, according to a variant of the invention, to calculate the "lifespan" parameter, disregarding the conventional B type images when determining the number of subsequent images in which the macroblock would be located. It is also possible, according to a variant, to disregard the B-stored type images, which are images which can be used as a reference but only for the conventional B images, and the conventional B-type images. The value of m is then the analysis period, considering only the P or I type images.

The FMO tool defines regions, in fact slice groups (in accordance with the H.264/AVC standard). The order of processing of the macroblocks in a slice group corresponds to the television scanning, considering only the macroblocks of the slice group. Each slice group or region is processed in turn according to the number assigned to the group.

The method described can be used to structure the slice groups according to the space-time behaviour of image areas, via the movement field analysis. Since the slice groups are structured, the latter can then be protected accordingly such that the groups considered the most indispensable, according to this movement field analysis, can use the most effective correcting codes.

The region configuration circuit therefore defines, according to the disparity of a "lifespan" parameter, different regions in the image. The blocks that have the same value or similar value for this parameter are combined into regions. These regions are numbered, the first slice groups are those corresponding to the highest parameter values and the last groups those corresponding to the lowest parameter values.

It will be noted that, because the slices are made up according to the nature of the movement field, the decoder can more effectively carry out error masking processes. This is on condition that the decoder is provided with effective algorithms for this type of processing, based, among other things, on the analysis of the movement field to reconstruct the parts of the image not decoded as part of the residual errors, that is, the errors that could not be corrected by the error correcting codes. They are, for example, time-predictive masking algorithms as mentioned in the MPEG standards. In practice, it is the macroblocks that have the greatest probabilities of being used as a basis for the subsequent predictions that are coded with a powerful error correcting algorithm.

Figures 2, 3:
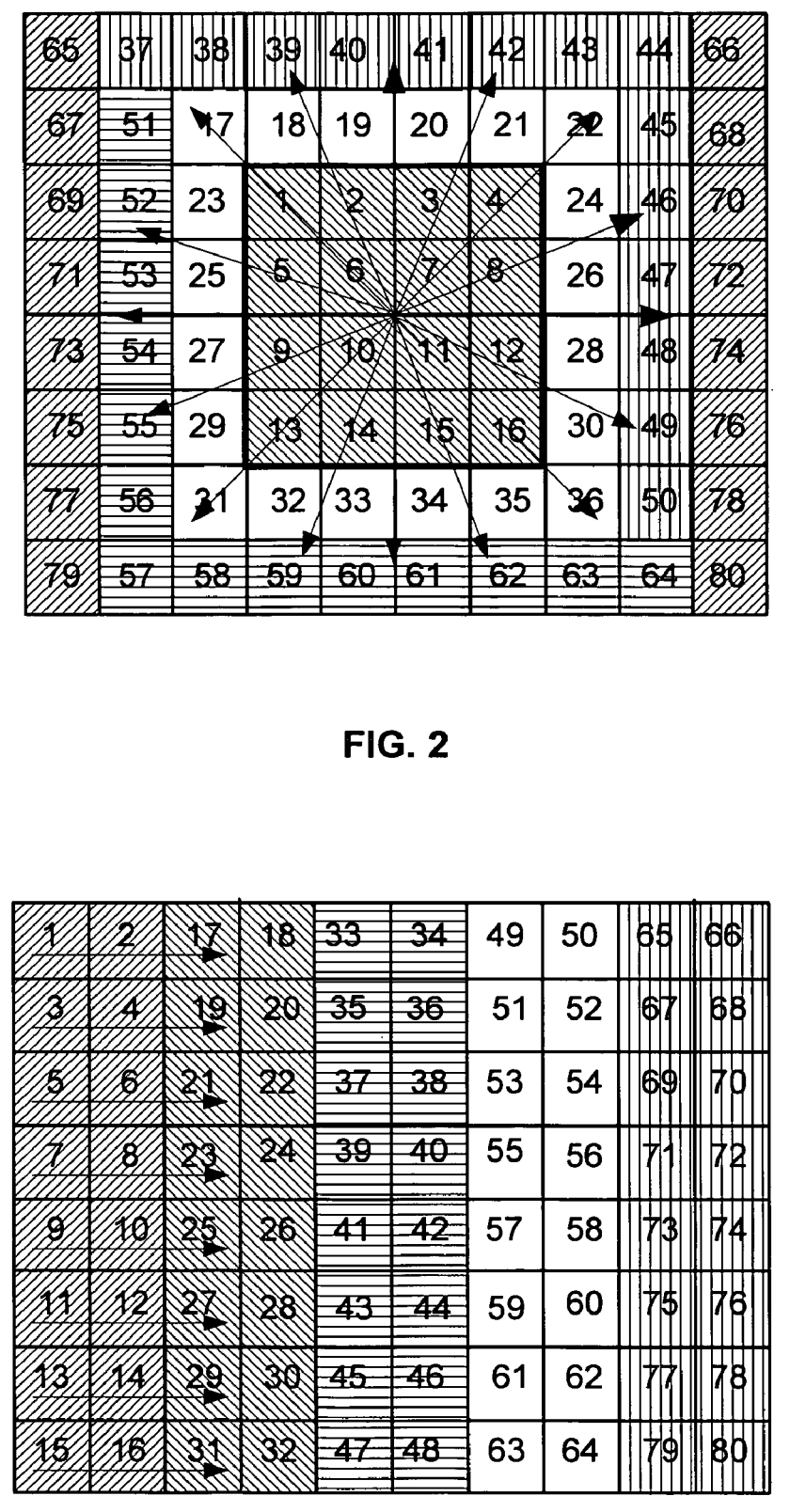

FIG. 2 represents an image subdivided into macroblocks and their breakdown into regions or slice groups in the context of a zoom-in.

In the case of a zoom-in, it is advantageous to form the first slices from the central part of the image, this area of the image being the most precious in terms of time prediction.

The example of distribution of the slice groups represented in FIG. 2 is therefore as follows:
- slice group n°1: macroblocks in the centre, with oblique cross-hatching from top left to bottom right,
- slice group n°2: macroblocks with no cross-hatching around group n°1,
- slice group n°3: macroblocks with horizontal cross-hatching, around group n°2,
- slice group n°4: macroblocks with vertical cross-hatching around group n°2,
- slice group n°5: macroblocks with oblique cross-hatching from right to left at the right and left edges of the image.

The macroblocks of the first group are numbered 1 to 16, those of the second group 17 to 36, those of the third group 37 to 50, those of the fourth group 51 to 64, those of the fifth group 65 to 80.

FIG. 3 represents an image subdivided into macroblocks and their distribution into regions or slice groups in the context of a pan to the left. In this configuration, the first slices are formed by blocks belonging to the new areas entering into the scene, the latter needing to be used for prediction while these areas remain in the image.

The example of distribution of the slice groups represented in FIG. 3 is therefore as follows:
- slice group n°1: macroblocks on the left of the image, with oblique cross-hatching from top right to bottom left,
- slice group n°2: macroblocks to the right of group n°1, with oblique cross-hatching from left to right,
- slice group n°3: macroblocks with horizontal cross-hatching, to the right of group n°2,
- slice group n°4: macroblocks with no cross-hatching, to the right of group n°3,
- slice group n°5: macroblocks with vertical cross-hatching to the right of group n°4.

The macroblocks of the first group are numbered 1 to 16, those of the second group 17 to 32, those of the third group 33 to 48, those of the fourth group 49 to 64, those of the fifth group 65 to 80.

Thus, the first macroblocks to leave the field of the image, which are those numbered 65 to 80, form the last slice group which is therefore coded with a less effective error correction.

To limit the number of regions, it is possible to define these regions by an upper and lower limit of the "lifespan" parameter value. Thus, a region will be formed by the set of macroblocks for which the associated parameter is within the range defining the region. These limits can be chosen according to the disparity of the parameter for an image.

The applications typically concern digital image transmission, in particular over multi-vendor networks, using a video coding standard including an FMO-type tool for dividing macroblocks into slices.

What is claimed is:

1. Method of coding a sequence of images including a step for subdividing the images into blocks of images, a step for configuring the blocks into regions, a region corresponding to a succession of consecutive or non-consecutive blocks, according to the television scanning order of the image,
a step for estimating movement between a current image and a preceding image of the sequence to provide a field of movement associating movement vectors with the image blocks,
an inter- or intra-block coding step, the blocks being coded by region according to an ordering of the regions, and, for a region, according to the order of succession of the blocks that make up the region,
a coded block error correction step,
wherein,
a step for analysing the field of movement is carried out to calculate a "lifespan" parameter assigned to a block and corresponding to its probability of existence in subsequent images, according to the movement vector associated with this block, said "lifespan" parameter of the block being calculated by extrapolating the movement vector of the field of movement assigned to the block,
the configuring step is performed taking into account the value of this parameter to define and order the regions of the image from most important to least important,
the error correction step uses a more effective error correction algorithm for the coded data corresponding to the most important regions than for the data corresponding to the least important regions.

2. Method according to claim 1, wherein the images taken into account in the image reference base to determine the probability of existence are the images other than those of conventional predictive bidirectional B type.

3. Method according to claim 1, wherein the images taken into account in the image reference base to determine the probability of existence are images other than those of conventional predictive bidirectional B and B-stored type.

4. Method according to claim 1, wherein the movement vectors calculated for the image numbered M of the sequence of images are extrapolated towards the images numbered M+m, M+2m, M+3m . . . , m being a positive integer, and wherein the value of the parameter of a block depends on the number of times the end of the vector assigned to this block belongs to these images.

5. Device for coding a sequence of images to implement the method according to claim 1, comprising a circuit for subdividing images and configuring regions to configure the image into regions made up of blocks of images, a region corresponding to a succession of consecutive or non-consecutive blocks according to the television scanning order of the image, and to supply these blocks of images according to an order of the regions, to a movement estimation circuit and to an inter and intra coding circuit, the coded blocks being transmitted to an error correction circuit, wherein it includes a movement field analysis circuit for calculating a "lifespan" parameter of the blocks according to the movement vectors of the movement field, said "lifespan" parameter of the block being calculated by extrapolating the movement vector of the field of movement assigned to the block, wherein the circuit for subdividing images and configuring regions receives the lifespan parameter to configure and order the regions from most important to least important according to this parameter, and wherein the error correction circuit implements more effective algorithms for the data corresponding to the most important regions than for the data corresponding to the least important ones.

6. Device according to claim 5, wherein a region corresponds to a slice or slice group.

* * * * *